United States Patent [19]

Taki

[11] 4,183,582
[45] Jan. 15, 1980

[54] EMERGENCY PASSIVE RESTRAINT PROTECTIVE SYSTEM FOR VEHICLE OCCUPANTS

[76] Inventor: Kiyoji Taki, 9 Gotanda, Katahara-cho, Gamagoori, Aichi Prefecture, Japan

[21] Appl. No.: 934,603

[22] Filed: Aug. 17, 1978

[30] Foreign Application Priority Data

Oct. 11, 1977 [JP] Japan .............................. 52-120995

[51] Int. Cl.² ............................................ A62B 35/00
[52] U.S. Cl. ................................... 297/464; 280/802; 297/216; 297/469
[58] Field of Search ............... 297/385, 384, 216, 219; 280/745

[56] References Cited

U.S. PATENT DOCUMENTS

| | | | |
|---|---|---|---|
| 2,270,172 | 1/1942 | Ruegger | 297/216 |
| 2,796,112 | 6/1957 | Barsky | 297/216 |
| 2,818,909 | 1/1958 | Burnett | 297/216 |
| 2,943,866 | 7/1960 | Witter | 297/216 X |
| 3,357,736 | 12/1967 | McCarthy | 297/216 X |
| 3,591,232 | 7/1971 | Simon | 297/216 |

*Primary Examiner*—James T. McCall

[57] ABSTRACT

The present invention relates to an emergency passive restraint system comprises a protector supported along the side walls of the seat, and combined with a push-up means, and a flexible cord connected with a slider movable along the leg of the protector and with a pull-up means in both sides of the seat. Both of the restraining members are actuated simultaneously in emergency. The occupant's knees are lifted by the upward movement of the protector, and the cords are pulled up to a diagonal position, so that the occupant is restrained against his forward and lateral movements simultaneously.

1 Claim, 10 Drawing Figures

EMERGENCY PASSIVE RESTRAINT PROTECTIVE SYSTEM FOR VEHICLE OCCUPANTS

BACKGROUND OF THE INVENTION

Although wearing of safety seat belts has proved to be effective protector for occupants in vehicles by restraining their bodies during emergencies, their unpopularity can be traced to the psychological aversion of the vehicle occupants to wear the belts by themselves and being restrained with straps. The mandatory usage of safety belts may be hardly accepted by most people, especially in the United States.

In order to solve this problem many passive safety systems, such as door-passive belts, air bags and elastic cushions have been devised but all of these systems, unfortunately, have their own defects.

A door-passive belt system requires installation of numerous complicated devices within the vehicle for lifting the belt synchronized with the movement of the door when occupants enter or leave the vehicle. This system not only requires longer belt and stronger retractor, or, additional retractors, but in some cases, belt guiding devices. Such additional complicated devices increase possibilities of failures, and worse, secondary collision injuries.

In an air-bag system the complete prevention of failure is difficult and protection against roll over accidents cannot be assured. Moreover, some propellants for air-bag inflation involve safety problems concerning installation, exchange or disposal, which will conflict with the legal reatrictions in some countries. In a cushion system, only the knees of an occupant seated in the front seat are protected. For complete protection for all occupants, a number of cushions have to be installed in all directions. Theoretically possible, but practical application has many problems. The existing cushion system, therefore, is supplemented with a belt system, usually lap belts, which must be adjusted manually. The aforementioned psychological aversion against belt or strap restraining will reduce its application.

Another type of vehicle restraint system consists of mechanical device which changes the position of the occupant or the occupant together with the position of the seat at the time of collision. For instance, M. Witter discloses a protective device in U.S. Pat. No. 2,943,866 filed Jan. 7, 1958 which comprises an upward raising means for the knees of the occupant to prevent the body from moving forward in collision by T-shaped raising means adapted to be mounted on a vehicle in front of the seat. It is believed, however, that the moving distance of the raising means cannot be large enough to protect the occupant in severe collision, or, for roll-over accident. A safety seat is proposed by M. Hartel in U.S. Pat. No. 2,736,566 filed Feb. 28, 1956, which could be said to be more effective than that of Witter's patent because the occupant is double up deeper, but Hartel's devised seat is believed not effective against roll-over accident. This mechanism, moreover, requires greater force to move the occupant together with the seat than moving the occupant alone.

Other types with movable seat system are disclosed by L. A. Woodsworth in U.S. Pat. No. 2,660,222 filed May 29, 1952, and by C. J. Lawrence in U.S. Pat. No. 2,823,730 filed Feb. 18, 1958. The former relates to a seat supported on a base by front and rear wheels. The plate supporting the rear wheels swings downward when the plate is unlocked by the action of pendulum weight tilting the seat rearward, while at the same time, the seat slides forward along the inclined track at the base. The latter movable seat system relates to a seat which is moved forward by momentum of the vehicle, while the frontal edge of the seat is moved upward by a brace, and the rear edge is moved downward from the disengaged hinged support.

Both of these systems require special construction of seats and vehicle body. Moreover, their effectiveness in roll-over accident is doubtful. Although a yoke-type or U-shaped lateral restraining member is disclosed respectively by Al Barsky (U.S. Pat. No. 2,796,112, filed Mar. 16, 1956) and L. B. Simon (U.S. Pat. No. 3,591,232, filed Apr. 1, 1969), these members are still not completely effective for lateral accidents, especially in the present trafic conditions of far higher speeds than those when these inventions were disclosed.

Many other safety devices have been proposed but all have their respective defects. A more simple, reliable and economical passive restraint protective system is urgently required. Especially, with the advent of speedier and efficient motor vehicles, the present invention provides the very system responding to these modern requirements.

SUMMARY OF THE INVENTION

It is the primary object of the present invention to provide an improved emergency passive restraint system comprising a protector to be mounted along the seat walls so as to give no disturbance to an occupant on entering or leaving or driving the vehicle, and to restrain the occupant by upward movement of the protector in a collision.

Another object of the invention is to provide an emergency restraint system wherein an occupant is restrained onto a seat back in a collision with his knees bent and body doubled which is the best position for protection of human body against external shock force.

A further object of the invention is to provide an emergency restraint system for a roll-over accident of motor vehicles.

The feature of the present invention can be clearly understood from the following embodiments illustrated in the drawings.

Although illustrated and described as embodied in a motor vehicle, it is not intended to be limited to the details shown. It is with the understanding that modification and structural changes may be made without departing from the general principle of the invention. It is also to be understood that the restraint system may also find usuful application in other types of restraint protective system differing from the type to be described.

DESCRIPTION OF THE REFERRED EMBODIMENTS

Figure 1:
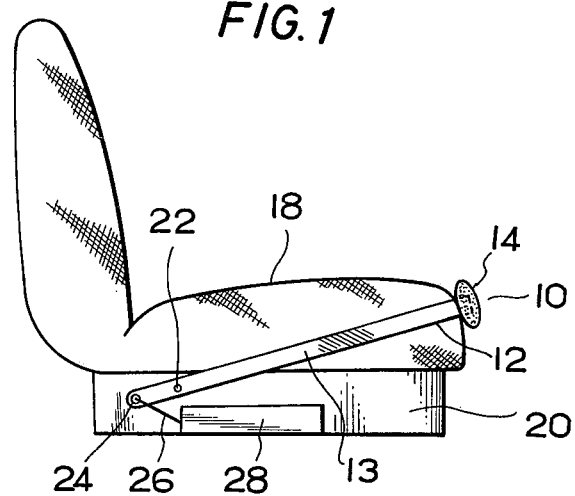
FIG. 1 is the side elevational view of an example comprising a rigid protector.
Figure 2:
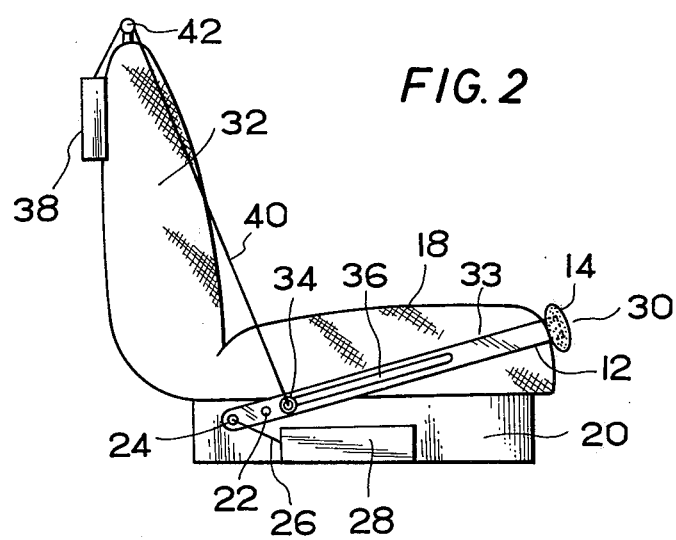
FIG. 2 is the side elevational view of an embodiment of the present invention comprising a rigid protector combined with a subsidiary cord, and pull-up means.

FIG. 1 illustrates a modification of well-known U-shaped restraining member, wherein a protector 10 comprising a U-shaped rigid member 12 covered with elastic material 14, and supported along the side walls of a seat 18. The protector 10 is pivoted to seat frame 20 by a pivot 22 located near the end of the leg 13 of the protector 10 at both sides of the seat frame 20. An actuating connection hole 24, located at the end of the leg 13 beyond pivot 22 is connected with each of a pair of push-up means 28 mounted on the seat frame 20 by means of a connector member 26, preferably an universal joint, on both sides of the seat 18 respectively. The central portion of the protector 10 is rotated upwardly around the pivot 22 by the pulling action exerted at the end of the leg 13 by means of the connector member 26 and the push-up means 28 actuated by a sensor (not shown in the figure), pushing up the knees of an occupant, and consequently restraining the occupant onto the seat back 32 in a double up position. The push-up means 28 shall be equipped with sufficient energy to sustain the load, such as coil spring of fluid piston, which will react with definite speed for the timely protection of an occupant in a collision. FIG. 2 is an illustration of an embodiment of the present invention with a slider 34 which moves inside a slit 36 provided in leg 13 of a protector 30. The slider 34 is connected with a subsidiary pull-up means 38 by means of a flexible cord 40 passing through a guide roll 42 mounted on the shoulder of the seat back 32. The subsidiary pull-up means 38 is mounted on the back wall of the seat back 32 to supplement the energy required in restraining an occupant in coordination with the push-up means 28, or, with other efficient retractors which are synchronized to react instantaneously by a sensor (not shown in the figure) in a collision.

Figure 3:
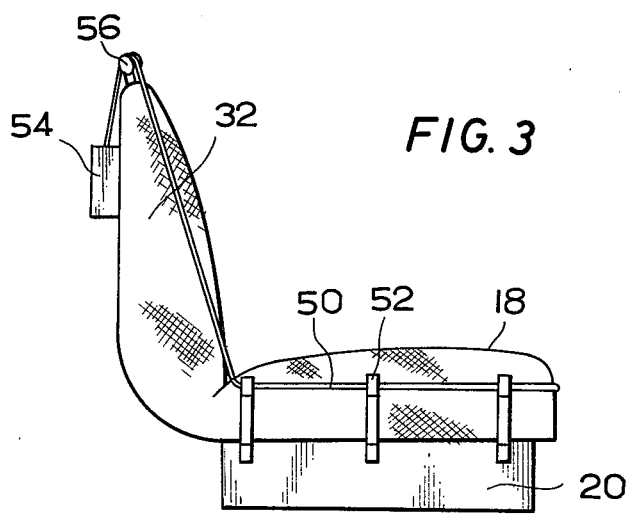
FIG. 3 is the side elevational view of another embodiment comprising flexible fibrous protector.
Figure 4:
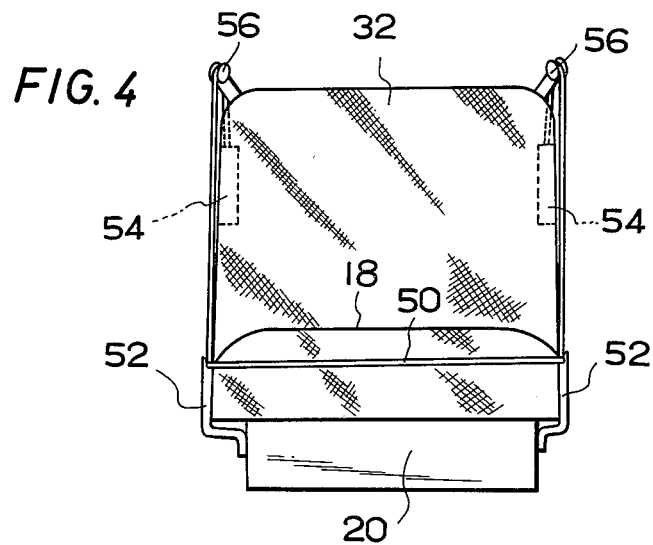
FIG. 4 is the frontal elevational view of the third embodiment.

FIG. 3 illustrates a protector 50 comprising a flexible fibrous braid or belt supported along the upper edges of the side walls of a seat 18 by means of several hooks 52, and the end of the protector 50 is led to a pull-up means 54, preferably a spiral spring driven retractor, through a guide roll 56, mounted on the shoulder of the seat back 32. FIG. 3 is the side elevational view, and FIG. 4 is the frontal elevational view of the third embodiment respectively. Preferably, protector 50 should be of a material of synthetic fiber braid with properties of high tensile strength and low elongation to withstand the force required to restrain occupants in a collision. A number of hooks 52 are arranged in appropriate distance on the side walls of the seat frame 20.

Figure 5:
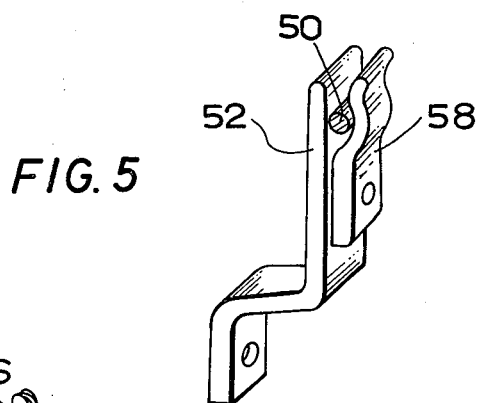
FIG. 5 illustrates the hook in the same embodiment.

FIG. 5 illustrates a typical configuration of the hook 52. A spring clip 58 mounted on hook 52, holds the protector 50 in normal position. When stronger force than that of the spring is applied upwardly, protector 50 is released and surges upwardly by means of the retractor 54, actuated by a collision sensor (not shown in the figure). The retractor 54, preferably, should possess sufficient rotating force with a lock mechanism which is released by the action of a sensor. The retractor does not need a lock mechanism responding to the withdrawing velocity of belts such as those used for safety belt systems. The length to be retracted will depend on the size of the seat 18 which regulates the whole length of the protector 50 in normal position and also upon the physique of an occupant to be restrained in case of collision. The length will correspond with the diameter of the retractor reel and its rotating force, capable of finishing the retraction of the protector 50 within the specific time required for occupant restraint systems.

Figure 6:
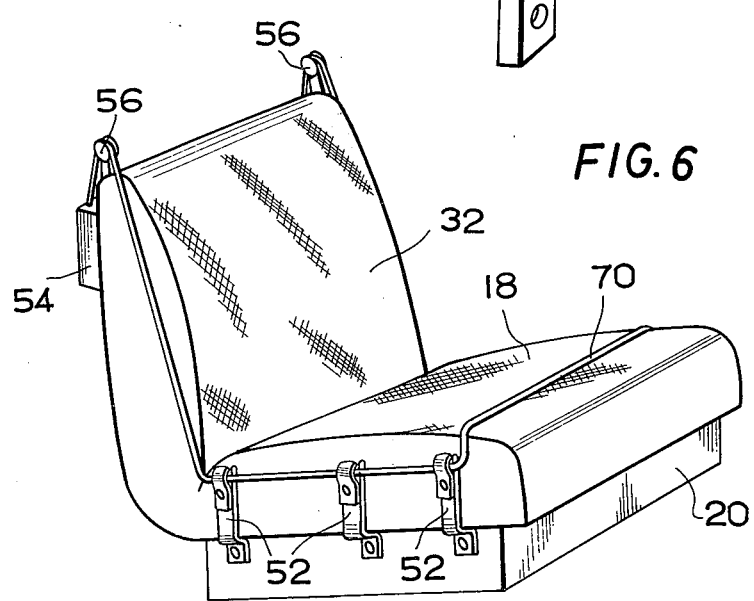
FIG. 6 is the perspective view of an embodiment preferable for a driver's seat.
Figure 7:
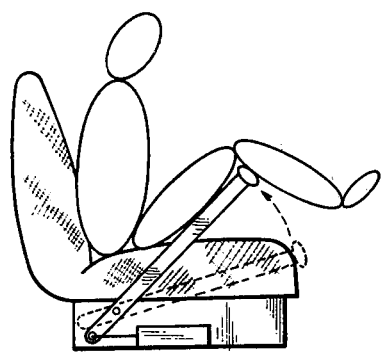
FIGS. 7 to 10 illustrate the operation of the protector shown on the four embodiments.
Figure 8:
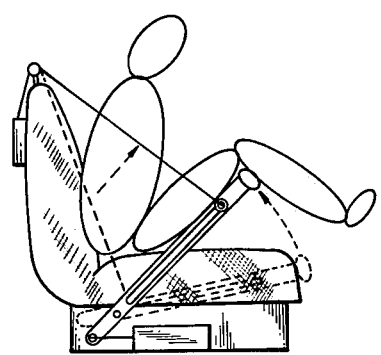
Figure 9:
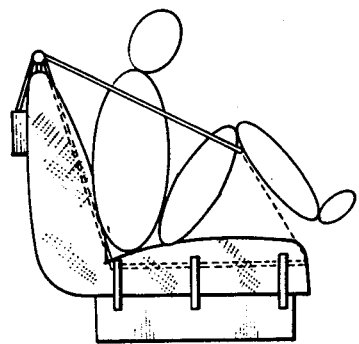
Figure 10:
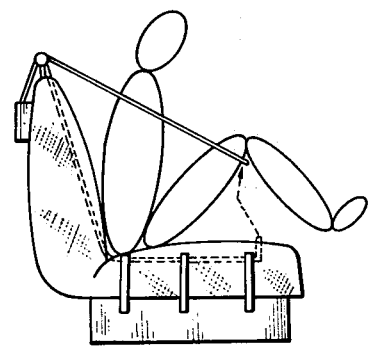

When these afore-described three embodiments are to be applied to the driver seat, the upward movement of the protector may be obstructed by the steering wheel of the motor vehicle if the steering wheel is not designed to contract automatically in collision. FIG. 6 illustrates the perspective view of a modification of the second embodiment to be applied for driver seat. The middle portion of a protector 70, corresponding to the width of the driver seat 72, is placed on the seat near to the front edge of the driver seat 72 so that protector 70 will not touch the steering wheel (not illustrated in FIG. 6) when the protector 70 is pulled upwardly in collision. The same modification can be made for cases in the other embodiments. It should be understood that the push-up means, the subsidiary pull-up means, and the guide roll should be installed in pairs so that the installation will be one on each side of the seat respectively. FIGS. 7 to 10 illustrate the operation of the protector during collision for each embodiment. The upper half of an occupant's body is forced to take a double up form by the pressing action of the protector, and the upper half of the body is pressed onto the seat back in a collision. Such a double up form has been proven to be most effective in preventing body injury from external shock force. Emergency manual for airline passengers instructs passengers to take this position in emergency. At the same time the cord is moved upwardly to a diagonal position from the knees to the shoulders of the occupant so as to restrain his lateral movement in accidents.

In the present invention, one protector for one occupant is preferable, but one protector for plural occupants on a bench-type seat is also effective when equipped across the seat from one side to the other. The present invention serves as protector for in any frontal and/or lateral accident.

The movement of the arms of an occupant may be affected to some extent by the protector but the effect is not so severe as to restrict the protecting action of the occupant to cover his face, or, his escaping from a crashed vehicle by pressing down the protector after a collision, because the distance between the two guide rolls is wider than the width of a human shoulder. The feet of an occupant are held up away from the brake and accelerator pedals by means of the protector as shown in FIGS. 7 to 10. This means another advantage of the present invention in that the driver is unable to erronously step on the accelerator pedal unconsciously in a frontal collision which is occationally done to worsen the damage. Furthermore, when the feet are stretched toward the front frame or dashboard, this position will be helpful in reducing the forward movement of the upper part of the occupant's body. The injuries, if any, received on the outstretched feet from the front glass would be far less than injuries received on the face or head of the occupant without effective restraint system.

The advantages of the present invention can be summarized as follows:

(1) The system exhibits no inconvenience to an occupants in entering or leaving or driving the vehicle, and an occupant is not conscious of the existence of a protective device in normal state, although the device can react instantly in case of emergencies.

(2) The system requires only a vehicle-sensitive sensor which does not include web-sensitive or hybrid sensors. This system has the added advantage of simplicity, reliability and low cost.

(3) The system is capable of restraining the occupant in a roll-over accident.

(4) The system does not require excessive adjustment in restraining occupants, be they a little child, obese or lean adult, or, pregnant woman.

(5) The system is free from any submarine trouble.

(6) The system is applicable to any type of seats including sliding type or bench type.

(7) The system enables easier escape after collision compared to 3-point safety belt system.

As described above in details, the present invention provides a completely passive and most effective restraint system for protecting human lives in vehicles.

I claim:

1. An emergency passive restraint device for vehicle occupants causing no disturbance for said occupant in entering, leaving, or driving said vehicle in normal state, being actuated to lift the occupant's knees upwardly so as to restrain said occupant against his forward and lateral movements simultaneously in emergency, comprising a horizontal rigid protective member covered with an elastic material, being supported along the front and side walls of the vehicle seat, having a pair of rigid legs extending toward the rear end of said seat, being pivoted to the frame of said seat at the near end of said leg, and being connected with a protector push-up means at the end of said leg beyond said pivot respectively, and a pair of flexible cords being disposed along the side portion of the seat back, and being connected with a slider movable along said leg at one end of said cord, and at the other end connected with a cord pull-up means through a guide roll mounted on the shoulder of said seat back respectively.

* * * * *